(12) United States Patent
Metni et al.

(10) Patent No.: US 7,156,744 B2
(45) Date of Patent: Jan. 2, 2007

(54) RECIRCULATING VERTICAL WIND TUNNEL SKYDIVING SIMULATOR

(75) Inventors: N. Alan Metni, Orlando, FL (US); William J. Kitchen, Orlando, FL (US); Kenneth Mort, Morgan Hill, CA (US); Charles Eastlake, Port Orange, FL (US); Michael Palmer, Poquoson, VA (US)

(73) Assignee: Skyventure, LLC, Austin, TX (US)

( * ) Notice: Subject to any disclaimer, the term of this patent is extended or adjusted under 35 U.S.C. 154(b) by 54 days.

(21) Appl. No.: 10/909,088

(22) Filed: Jul. 30, 2004

(65) Prior Publication Data

US 2006/0025227 A1   Feb. 2, 2006

(51) Int. Cl.
    *A63G 31/12*   (2006.01)
(52) U.S. Cl. .......................... 472/50; 472/68; 472/137
(58) Field of Classification Search ............ 472/59–61, 472/49, 50, 137, 68; 434/247; 73/147
    See application file for complete search history.

(56) References Cited

U.S. PATENT DOCUMENTS

| | | |
|---|---|---|
| 2,486,287 A | 10/1949 | Jackson |
| 2,560,634 A | 7/1951 | Colley |
| 2,788,020 A | 4/1957 | Davie, Jr. |
| 2,799,161 A | 7/1957 | Greene et al. |
| 2,933,922 A | 4/1960 | Davis |
| 3,484,953 A | 12/1969 | Norheim, Jr. |
| 4,308,748 A | 1/1982 | Jacocks |
| 4,457,509 A | 7/1984 | St. Germain |
| 4,487,410 A | 12/1984 | Sassak |
| 4,545,574 A | 10/1985 | Sassak |
| 4,578,037 A | 3/1986 | Macangus et al. |
| 4,700,565 A | 10/1987 | Albuschkat |
| 5,046,358 A | 9/1991 | Wulf et al. |
| 5,209,702 A | 5/1993 | Arenas |
| 5,417,615 A | 5/1995 | Beard |
| 5,452,609 A | 9/1995 | Bouis |
| 5,593,352 A | 1/1997 | Methfessel et al. |
| 5,597,358 A * | 1/1997 | Marcu .......................... 472/50 |
| 5,655,909 A | 8/1997 | Kitchen et al. |
| 5,753,811 A | 5/1998 | Consolini |
| 5,964,666 A * | 10/1999 | Uemura ........................ 472/50 |

(Continued)

FOREIGN PATENT DOCUMENTS

CA   1 210959   9/1986

(Continued)

OTHER PUBLICATIONS

Metni, Alan, "Recirculating Vertical Wind Tunnel Training Device" This is an unfiled patent specification.

(Continued)

*Primary Examiner*—Kien Nguyen
(74) *Attorney, Agent, or Firm*—Rick Martin; Patent Law Offices of RickMartin, PC

(57) ABSTRACT

A vertical wind tunnel flight simulator comprises a flight chamber wherein a flier may experience a freefall simulation. Airflow to support the flier is induced by fans connected above the flight chamber through a duct. A staging area having openings to the flight chamber is adjacent to the flight chamber. One or two return air ducts are used to return air from the fans outlet to the fans inlet. Opposed louvers are included on at least one duct segment thereby regulating the temperature via forcing ambient air into the simulator. The use of many duct segments having diverging walls adds commercial value to the system by lowering the height. Mounting components on the roof and behind walls creates a spectacular pedestrian viewing scene of people in flight.

34 Claims, 16 Drawing Sheets

U.S. PATENT DOCUMENTS

| | | | |
|---|---|---|---|
| 6,083,110 | A | 7/2000 | Kitchen et al. |
| 6,315,672 | B1 * | 11/2001 | Gillot et al. ................. 472/50 |
| 2004/0115593 | A1 | 6/2004 | Haltestad |

FOREIGN PATENT DOCUMENTS

| | | |
|---|---|---|
| FR | 2659620 | 9/1991 |
| FR | 2843940 | 3/2004 |
| WO | PCT/GB82/00298 | 10/1982 |

OTHER PUBLICATIONS

DD Form 1391c Army, FY 1985 Military Construction Project Data, dated Dec. 12, 1984, Ft. Bragg, NC, Titled: Unspecified Minor Construction Free Fall Simulation Facility, Project No. T897.

Agard Memorandum, Papers Presented at the Sixth Meeting of the Wind Tunnel and Model Testing Panel, Paris France, Nov. 6, 1954, "Design and Operating Techniques of Vertical Spin Tunnels", A.I. Neilhouse, pp. 399-420.

Agard Memorandum, Papers Presented at the Sixth Meeting of the Wind Tunnel and Model Testing Panel, Paris France, Nov. 6, 1954, "The Vertical Spinning Tunnel at the National Aeronautical Establishment, Bedford", A.E. Clarke and R.L. Maltby, pp. 421-440.

Glen L. Martin Wind Tunnel, University of Maryland, College Park, Maryland 20742, "Solving Problems Throught Advanced Technology", 7 pages.

Calspan Corporation, Buffalo, New York, 14221, "8-Foot Transonic Wind Tunnel", Calspan Report No. WTO-300, Revised Oct. 1971 pp. 1-67.

Nasa Ames Research Center, Moffet Field, CA 94035, Guide for Planning Investigations in the Ames 40-by 80 ft. Wind Tunnel Operated by the Low Speed Wind Tunnel Investigations Branch (FHW). Revised Mar. 1984, pp. 1-52 and Appendix A, Jun. 1982, revised Jan. 1984, pp. 1-42; and Appendix B, revised Feb. 1984, pp. 1-5.

PCT Invitation to Pay Additional Fees (in correspondingPCT Application) 5 pages.

International search report and Written Opinion for corresponding PCT application.

* cited by examiner

RECIRCULATING VERTICAL WIND TUNNEL SKYDIVING SIMULATOR

CROSS REFERENCE PATENTS

U.S. Pat. No. 6,083,110 is incorporated herein by reference.

FIELD OF THE INVENTION

The present invention relates to the field of vertical wind tunnels, more particularly, to temperature controlled return flow vertical wind tunnels used as skydiving simulators and amusement devices.

BACKGROUND OF THE INVENTION

Wind tunnels are well known in the art. Wind tunnels are available in many types and styles depending upon the needs of the user. These include subsonic wind tunnels with and without return flow, transonic wind tunnels with and without return flow, vertical subsonic wind tunnels with and without return flow, supersonic and hypersonic wind tunnels with and without return flow, and compressible flow wind tunnels.

The majority of the wind tunnels are used for research and testing purposes. These include testing of conventional aircraft, helicopters, parachutes and other aerodynamic devices, wing surfaces, control surfaces, submarines, rockets and other launch vehicles, ground vehicles, buildings and other basic flow investigations.

Horizontal wind tunnels (those in which the air in the full speed section of the tunnel flow generally horizontally) are used for aerodynamic research and testing and are generally owned by major defense oriented corporations, the Federal government, or educational institutions and universities. Some of these have been converted or adapted for vertical operation (in which the air in the full speed section of the tunnel flows generally vertically) but most or all perform poorly in that role. Design constraints that apply to vertical wind tunnels used for freefall simulation differ from those of horizontal testing tunnels. In a vertical wind tunnel/freefall simulator, it is important that the objects in the full speed section of the wind tunnel (in this case the human beings in flight) be able to move about inside that section to experience or practice human body flight. In a horizontal test tunnel, the objects placed in the tunnel are usually static objects observed or measured by others. For this reason, this fastest part of a horizontal wind tunnel is called a "test section". In a vertical wind tunnel, this same area is instead referred to as the "flight chamber".

In a vertical wind tunnel, it is important that people flying inside the tunnel be allowed to rotate in and out of the flight chamber without stopping the airflow. In contrast, there is little need to move the static objects in the test section of a horizontal wind tunnel during its operation. Furthermore, since fliers in a vertical wind tunnel are free to move about inside flight chamber, it is necessary to constrain their movement to appropriate parts of the system. While it is possible to put a safety net on both the upstream and downstream ends of the flight chamber, these produce an enormous amount of drag which creates noise and increases the power required to attain any given speed. In fact, such a pair of nets can consume as much as 30% to 50% of the total power required to operate such a wind tunnel. It is also important to prevent occupants from flying laterally outside of the air column and falling unsupported to the floor below. For this reason, the most advanced vertical wind tunnels are designed such that the air column extends completely from one wall of the flight chamber to the other. This is not necessary in horizontal wind tunnels.

Vertical wind tunnels used for freefall simulation often have to operate in noise sensitive environments such as amusement parks and shopping malls. Horizontal testing tunnels can be located away from the crowds where they are free to make as much noise as is necessary.

As amusement devices, freefall simulators must compete with other amusements on the basis of price and can often be operated on a near continual basis. These two factors make energy efficiency critical to successful commercial operation of a freefall simulator. Energy efficiency is much less important for horizontal testing tunnels in which one often takes hours or days to set up an experiment and then only runs the tunnel for a few minutes to collect the necessary data.

Height is a major constraint of freefall simulators which stand upright and often must be sited in high-density entertainment venues that have severe height limitations. This is not true of horizontal testing tunnels which sit on their side and can be successfully located far away from any crowds.

Finally no known prior art has focused on designing these systems to optimize visibility to public spectators in a shopping mall or other high density entertainment venue.

To make a commercially viable vertical wind tunnel for skydiving simulation, one must (1) move enough air and do so smoothly enough to adequately simulate freefall for one or more persons in the flight chamber; (2) with a device that is short enough and quiet enough to be located where large numbers of potential customers tend to be; and, (3) at power consumption levels low enough to make the price of the experience acceptable to the public.

The inventive challenge of satisfying these competing requirements is met by the present invention. High airspeeds are required at the flight chamber to float one or more human beings. However, moving air through ductwork at high speeds creates an enormous amount of sound and heat and requires a huge amount of power. Consequently, most modern wind tunnels expand and slow the air just downstream of the flight chamber to decrease power consumption, noise output and heat generation. Doing so can reduce power consumption by more than 60%, and only by doing so will vertical wind tunnels become commercially viable as entertainment devices or skydiving simulators.

However, if one expands the airflow in any section of a wind tunnel too rapidly, the flow will "separate" and become turbulent rather than laminar. This will make the entire system perform poorly, increasing power consumption and decreasing flow quality to the point that the device will not adequately simulate true freefall. The threshold at which this flow separation occurs in an expanding duct is fairly well defined in the literature; in simple terms, the walls of such an expansion cone cannot diverge away from one another at greater than 9–12 degrees. For that reason, increasing the length of horizontal test tunnels or the height of vertical wind tunnels tends to improve efficiency. Unfortunately, while this is easily done for a horizontal system, doing so in a vertical system dramatically increases the construction and operation cost and reduces the number of places at which one can gain governmental approval to build. Consequently, minimizing height while maximizing the expansion and deceleration of the airflow downstream of the flight chamber is the key to making a vertical wind tunnel commercially successful. Similarly, constraining the occupants to the safe areas of the wind tunnel without increasing drag and power consumption is essential.

The prior art wind tunnels do not offer a design that is quiet and short enough to be built in high density shopping and entertainment venues while remaining efficient enough to allow commercially viable operation.

What is needed is a vertical wind tunnel amusement and training device having a flight chamber on the inlet side of the fans for improved airflow, speed and quality, at lower power consumption and higher safety for the fliers.

What is needed is a vertical wind tunnel amusement and training device having a sealed and pressure balanced staging area adjacent and connected to the flight chamber in a way that allows people to move in between the two without stopping the airflow.

What is needed is a vertical wind tunnel amusement and training device having transparent windows allowing spectators, instructors or others outside the flight chamber to see into it.

What is needed is a vertical wind tunnel amusement and training device having a plurality of smaller fans rather than a single, more expensive and difficult to maintain fan.

What is needed is a vertical wind tunnel amusement and training device having one or more return air ducts to conserve heat, reduce energy consumption, reduce noise and allow all-weather operation.

What is needed is a vertical wind tunnel amusement and training device having only one or two return ducts even though it may have a greater number of fans than return ducts.

What is needed is a vertical wind tunnel amusement and training device having fans housed in low profile casings that allow them to be mounted as closely together as possible so that more than one fan can be connected to each return air duct without the need for long transition ducts that would increase the height or width of the entire system.

What is needed is a vertical wind tunnel amusement and training device having a passive air exchange system that ejects heated air and draws in cooler ambient air in order to most efficiently control the temperature inside the wind tunnel.

What is needed is a vertical wind tunnel amusement and training device having a passive air exchange system the components of which form a "nozzle" or flow contaction that not only mechanically ejects the air from inside the wind tunnel but also creates the proper pressure gradient between the inside and outside of the wind tunnel and thereby encourages the efficient exchange of air between the wind tunnel and the ambient air.

What is needed is a vertical wind tunnel amusement and training device having a mesh "floor" made of specially designed cables that produce less drag and, therefore, less noise than conventional cables.

What is needed is a vertical wind tunnel amusement and training device having at least one zero-drag electronic upper barrier instead of a physical net to prevent fliers from moving too high in the flight chamber and quickly modulating the speed of the air to bring them back down to and hold them at a safe level.

What is needed is a vertical wind tunnel amusement and training device having the lowest possible total height for any given efficiency in order to reduce construction costs and meet common governmental constraints on building height.

What is needed is a vertical wind tunnel amusement and training device optimized for height by having most or all of the components downstream of the flight chamber expand the air as rapidly as possible without creating flow separation.

What is needed is a vertical wind tunnel amusement and training device optimized for height by providing an optional flight chamber in which the air is expanded as much as possible without creating separation as it passes through the flight chamber section or a flight chamber that is actually shaped like a diffuser.

What is needed is a vertical wind tunnel amusement and training device optimized for height and overall size by mounting the fans in conical ducts that themselves act as "diffusers".

What is needed is a vertical wind tunnel amusement and training device that allows installation configurations which optimize spectator viewing areas of the fliers to pedestrians in a shopping mall.

The present invention meets these needs.

SUMMARY OF THE INVENTION

An aspect of the present invention is to provide a vertical wind tunnel amusement device having a flight chamber situated on the inlet side of a plurality of fans which are in turn connected to a plurality of expanding return air ducts, thereby maximizing efficiency while minimizing the height of the amusement device.

Another aspect of the present invention is to provide a vertical wind tunnel having a flight chamber on the inlet side of the fans for improved airflow speed and quality, at lower power consumption and higher safety for the fliers.

Another aspect of the present invention is to provide a vertical wind tunnel having a two-stage staging area adjacent and connected to the flight chamber in a way that allows people to move in between the two without stopping the airflow.

Another aspect of the present invention is to provide a vertical wind tunnel having transparent windows allowing spectators, instructors or others outside the flight chamber to see into it, including in a shopping mall venue.

Another aspect of the present invention is to provide a vertical wind tunnel having a plurality of smaller fans angled in a non-parallel alignment rather than a single, more expensive and difficult to maintain fan.

Another aspect of the present invention is to provide a vertical wind tunnel having one or more return air ducts to conserve heat, reduce energy consumption, reduce noise and allow all-weather operation.

Another aspect of the present invention is to provide a vertical wind tunnel having only one or two return ducts even though it may have a greater number of fans than return ducts.

Another aspect of the present invention is to provide a vertical wind tunnel having fans housed in low profile, diffusing casings that allow them to be mounted as closely together as possible so that more than one fan can be connected to each return air duct without the need for long transition ducts that would increase the height or width of the entire system.

Another aspect of the present invention is to provide a vertical wind tunnel having a passive air exchange system with adjustable inlet/outlet doors that mechanically ejects heated air from the system and draw in cooler ambient air in order to most efficiently control the temperature inside the wind tunnel with minimal extra work by the fans.

Another aspect of the present invention is to provide a vertical wind tunnel in which the adjustable inlet/outlet doors are arranged such that they also form a "nozzle" or flow contraction thereby creating a favorable pressure gradient between the inside and outside of the tunnel and encouraging the air exchange in order to efficiently control the temperature inside the wind tunnel with minimal extra work by the fans and without the use of other more costly air cooling technologies.

Another aspect of the present invention is to provide a vertical wind tunnel in which the position of the inlet/outlet doors is controlled by known means in order to maintain a comfortable temperature inside the wind tunnel.

Another aspect of the present invention is to provide a vertical wind tunnel having a mesh "floor" made of specially designed cables (preferably steel) that produce less drag and, therefore, less noise than conventional cables.

Another aspect of the present invention is to provide a vertical wind tunnel having one or more zero-drag electronic upper barriers instead of a physical net designed to prevent fliers from moving too high in the flight chamber and capable of quickly modulating the speed of the air to bring fliers back down to and hold them at a safe level.

Another aspect of the present invention is to provide a vertical wind tunnel having the lowest possible total height for any given efficiency in order to reduce construction costs and meet common governmental constraints on building height.

Another aspect of the present invention is to provide a vertical wind tunnel optimized for height by having not just the primary diffuser just downstream of the flight chamber but also most or all of the components downstream of the flight chamber expand the air as rapidly as possible without creating flow separation.

Another aspect of the present invention is to provide a vertical wind tunnel optimized for height by expanding the air as much as possible without creating separation as it passes through the flight chamber. This diffusing flight chamber could also be thought of as a zero-height flight chamber or zero-length test section.

Another aspect of the present invention is to provide a vertical wind tunnel optimized for height by mounting the fans in conical ducts that themselves act as "diffusers".

Another aspect of the present invention is to provide a zero height flight chamber wherein the fliers fly in an expanding diffuser chamber with a reduced air velocity the higher they fly, thereby forming a self-catching flow in the chamber to slow the flier as he or she descends.

Other aspects of this invention will appear from the following description and appended claims, reference being made to the accompanying drawings forming a part of this specification wherein like reference characters designate corresponding parts in the several views.

To eliminate the risk of occupants falling out of the air column and injuring themselves, the air column extends completely from one wall of the flight chamber to the other. This "wall to wall" airflow also reduces drag at the edges of the air column and increases efficiency of the entire system. The airflow passes through a "cable floor" into the flight chamber. The cable floor provides support for the users when the airflow through the flight chamber is not sufficient to support them. At or near the upper (or downstream) end of the flight chamber, a "virtual net" comprised of one or more electronic (preferably optic) sensors, monitors the position of the occupant(s) within the flight chamber. In the preferred embodiment, the control system will automatically lower the speed if the occupant(s) fly too high in the flight chamber.

The flight chamber can be round, oval or polygonal and can range from a bit less than 75 square feet to over 160 square feet in area. The flight chamber may accommodate up to six users at a time. The airflow velocity in the flight chamber can reach as high as 160+mph, which will fully support as many as six users. In the preferred embodiment, one or more of the walls of the flight chamber include or comprise flat or curved windows constructed of transparent Plexiglas®, acrylic plastic, glass or similar high strength transparent material. When present, the windows into the flight chamber allow an unrestricted view of the activities taking place within the therein.

Adjacent to the flight chamber is a staging area. The flight chamber has an entry opening and exit opening to the staging area through which a user or multiple users may enter and exit the flight chamber. In certain embodiments in which rotations of occupants in and out of the flight chamber might be less frequent, these opening may be fitted with doors which slide, roll or otherwise move to close one or both of these openings. Users wait in the staging area for their turn in the flight chamber. The staging area has transparent windows so that an observer may view the flight of any person(s) within the flight chamber without entering the staging area. The staging area has a single or multiple doors that open periodically to allow people to exit the entire system. The staging area may also be fit with an optional "piggyback" or secondary staging area. This creates an airlock that allows groups to rotate in and out of the staging area from outside the system without requiring the airflow to stop.

The area above (downstream of) each doorway in upper section of the flight chamber may include perforated panel which provides an alternate airflow path when users are entering and exiting the flight chamber. In the preferred embodiment, a small flow deflector will also be located below (upstream of) the cable floor just below each opening between the flight chamber and staging area to minimize the amount of air moving between them and reduce the amount of balancing necessary.

The fans and other controls can be operated from inside the staging area, inside the flight chamber or from an attached or remote control room. The fans are controlled to achieve the optimum airflow velocity through the flight chamber.

Next above the perforated section is the primary divergent diffuser. The primary diffuser diverges at approximately 3.5 to 5 degrees from the major axis providing a "equivalent cone angle" of 7 to 10 degrees. The increasing cross-sectional area reduces the velocity of the airflow from the flight chamber to the fans. Above (or downstream of) the primary diffuser is the upper plenum which may include the first set of high efficiency turning vanes. In a single return system these turning vanes (or simply the plenum if no vanes are used) redirect the airflow from substantially vertical to substantially horizontal. In a multiple return system, these vanes (or simply the plenum if no vanes are used) split the air into to basically equal flows and turn each flow from substantially vertical to substantially horizontal.

The airflow then passes through the inlet ducts and into the fans. The fan inlet duct transitions the flow from roughly square or rectangular to roughly round. In the preferred embodiment, the fan inlet ducts act as diffusers expanding the flow area as much as possible without creating flow separation. The fans are preferably high-efficiency axial flow fans, although any fan adapted for use in a wind tunnel is acceptable. In the preferred embodiment, the fans contain a bullet-shaped nosecone and a teardrop-shaped tailcone. In the preferred embodiment, the fan casings act as diffusers and are sized such that, after taking into account the area in the center of the fan obscured by the nosecone, fan centerbody and tailcone, the net flow area through the fans increases as much as possible without creating flow separation. The velocity of the airflow through the invention is controlled by either changing the pitch of the fans or by changing the rotational speed of the fans.

The airflow passes through the fans and into the exit ducts which also transition from roughly round to roughly square or rectangular. In the preferred embodiment, the exit ducts are act as diffusers expanding the airflow as much as possible without creating flow separation. The airflow travels through a set of exit ducts to the second set of high-efficiency turning vanes (if used) which turn the air from substantially horizontal to substantially vertical.

The airflow then enters the return air ducts. In the preferred embodiment, these return air ducts are also shaped as divergent diffusers expanding the airflow as much as possible without creating flow separation. In the preferred embodiment, each return air duct has an air exchange mechanism comprised of an even number of louvers located on opposing faces of the return air duct. These are situated and sized so that they together create a nozzle or sudden contraction in the flow area at the point of the louvers. This nozzle [increases] decreases the [dynamic] static pressure at that point of the system and assists in the expulsion of heated air from the wind tunnel through the exhaust louver. This lowers the pressure in the system and assists the inlet louvers as they draw in cooler ambient air from outside of the system. This arrangement allows heated air in the system to be replaced with cooler ambient air, thereby allowing a user to adjust the temperature in the flight chamber for flyer comfort without the need for expensive alternatives such as air conditioning or evaporative cooling.

At the bottom (or downstream) end of the return air towers, the air again passes through a set of turning vanes (or simply a duct with a 90 degree turn if no vanes are used) that redirects the air from a substantially vertical to a substantially horizontal path. The air then enters the bottom plenum which may also act as a divergent diffuser expanding the air as much as possible without causing flow separation. At the end or the (or downstream) end of the bottom plenum, the air again passes through a set of turning vanes (or simply a duct with a 90 degree turn if no vanes are used) that redirects the air from a substantially horizontal to a substantially vertical path. In a multiple return system, the flows will be re-joined at this point.

The air then passes into the inlet contractor. This trumpet-shaped or bell-shaped device quickly reduces the flow area and accelerates the air to its maximum speed just ahead of the flight chamber. Here again aerodynamic laws govern how quickly one can reduce this flow area without degrading the quality of that flow.

BRIEF DESCRIPTION OF THE DRAWINGS

FIG. 21A is a sectional view taken along lines 21A—21A of FIG. 21.

Before explaining the disclosed embodiment of the present invention in detail, it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENT

Figure 1:
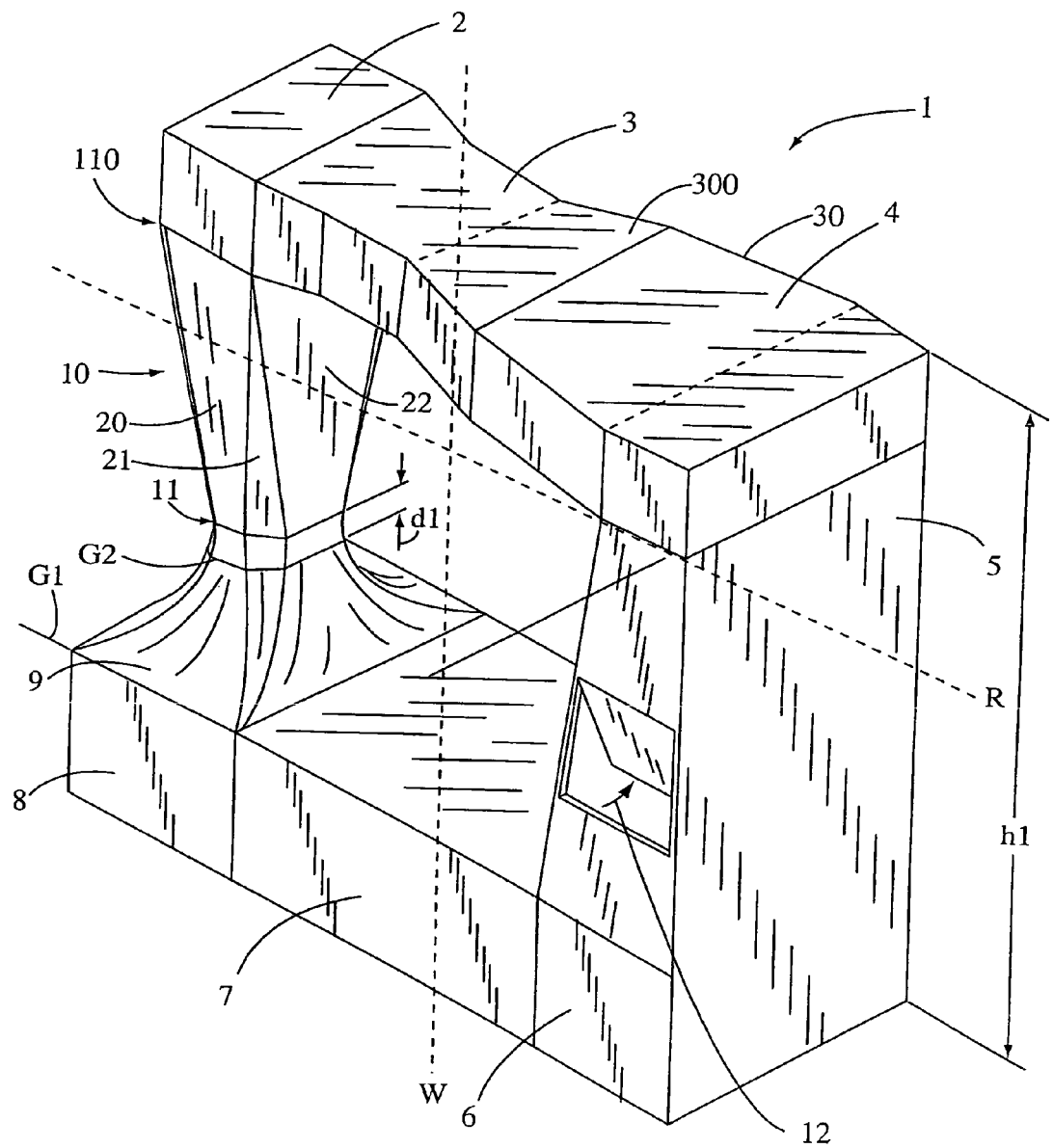
FIG. 1 is a top perspective view of a single return simulator.

Referring first to FIG. 1 a single return simulator 1 is shown, wherein height $L_1$ is preferably in the range of about 50–120 feet. Some installations may bury all components below a ground level of either $G_1$ or $G_2$. The flight chamber 10 may be made entirely or partially with transparent panels. If ground level is at $G_2$, then an opaque pedestal-type image formed in area $d_1$ which may be about seven feet high. This embodiment in a mall creates an eye-catching, live action human flight studio in the flight chamber 10. This design attracts new "fliers" who pay to experience simulated sky-diving in flight chamber 10. Dotted line R represents a roof, wherein components above R can be roof-mounted to reduce noise. Dotted line W represents a wall, wherein components beyond the wall W away from the flight chamber 10 could be isolated from the flight chamber to reduce noise near the flight chamber 10.

Most prior art flight chambers provide for parallel walls in the flight chamber so that experienced fliers can practice maneuvers at a constant wind velocity perhaps at around 140 miles per hour. Simulator 1 has a "zero height" flight chamber along elevation 11. Elevation 11 is the line which joins the airflow contractor 9 to the airflow diffuser 10, wherein the diffuser 10 has diverging walls 20,21,22, etc., and the diffuser 10 also serves as the flight chamber 10.

Nominally the air speed at line 11 is at about 140 mph, the maximum speed in the simulator. As the flier goes higher in the flight chamber 10 to the top of the flight chamber 10 to junction 110, the air speed drops, perhaps to about 120 mph. Fliers can change their drag profiles from a maximum spread eagle position to a minimum human ball position. Thus, if a flier ascends to the top of the flight chamber 10 and then changes his drag to a human ball shape, he will fall downward. The diffuser shape of the flight chamber 10 will provide a self-braking system due to the increasing airspeed with each incremental descent down into the flight chamber 10. A safety net is provided a line 11.

The diverter 2 meets the diffuser 10 at junction 110. The air is diverted from a vertical path to a horizontal path in the diverter 2. All the diverters 2,4,6,8 change the air direction by about 90 degrees.

The fan assembly 3 accelerates the air, perhaps with two side-by-side fans. The basic dynamics in a return air simulator involve compromises in energy efficiency, noise and size. In the simplest design, one would attempt to keep the airflow close to full speed for the entire loop through the simulator. However, the height would have to rise, the noise would be enormous, and the heat from friction in the plenums would be enormous. Therefore, for more efficient operation, it is necessary to slow the air down during its travel through the simulator loop by enlarging the cross-sectional areas of the plenum to attain commercially acceptable levels of height $h_1$ as well as noise, and simultaneously attempt to use the least horsepower possible for the fans.

The diverters 2,4,6,8 generally do not have diverging walls due to cost construction considerations. The fan housing segment 300 and the fan section 3 have diverging walls. The top plenum 30 has diverging walls. The Vertical return plenum 5 has diverging walls. The bottom plenum 7 does not have diverging walls due to tradeoffs in cost construction considerations. Bottom plenum 7 could have diverging walls.

The airflow contractor 9 has converging walls functioning to narrow the cross-sectional plenum area, thereby accelerating the air to about 140 mph for flight simulation.

The air inlet 12 brings in ambient air to cool the simulator air.

Figure 2:
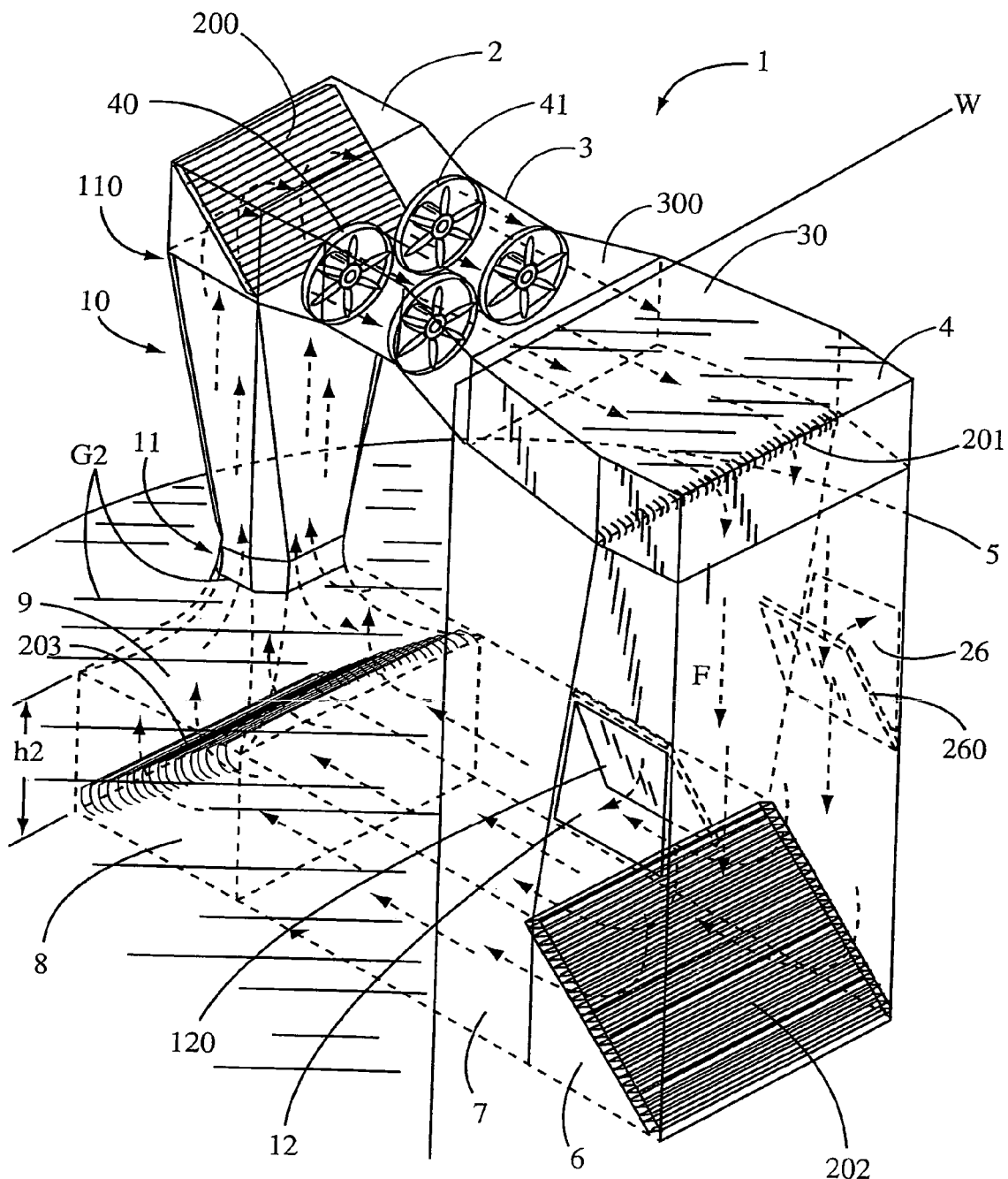
FIG. 2 is a cutaway view of the FIG. 1 embodiment.

Referring next to FIG. 2 a schematic representation of the internal workings of the simulator 1 is shown. Airflow is shown by the arrows F. Diverting vanes 200, 201, 202, 203 each change the airflow direction by 90 degrees. Two fans 40,41 are schematically shown mounted horizontally side by side in their housing 3, refer to FIG. 13 for a perspective view, wherein right after the fans a plenum diffuser 300 expands and slows the airflow. The diffusing continues in top plenum 30, and then in vertical return plenum 5, and finally through the flight chamber 10.

A passive temperature regulation system is provided by having air inlet 12 louver 120 face downstream. Additionally the air outlet 26 has a louver 260 that faces upstream. By mounting the inlet 12 about opposite outlet 26, a reducing nozzle is formed by louvers 120, 260, thereby creating a decreased static pressure zone V downstream from the inlet 12. Therefore, ambient air is [forced passively] drawn into the simulator 1 without the use of an additional fan.

Figure 3:
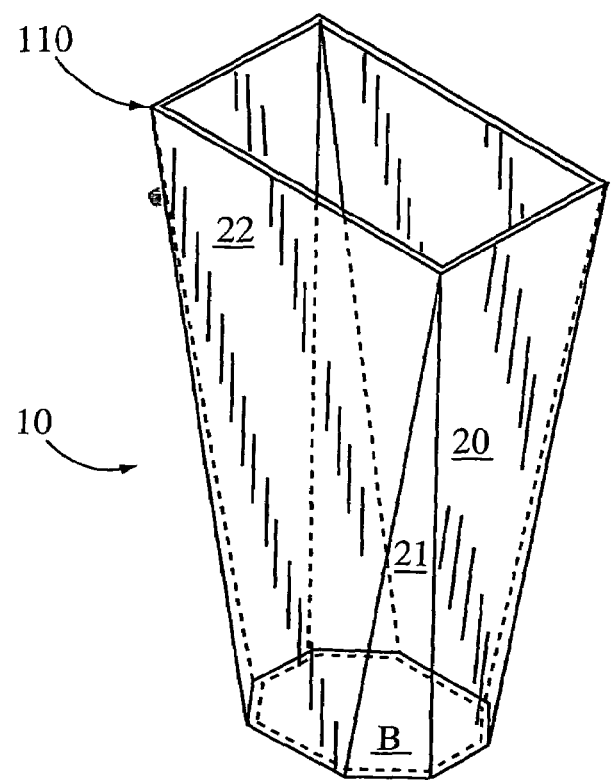
FIG. 3 is a top perspective view of the flight chamber of FIG. 1.

Referring next to FIG. 3 the diffuser/flight chamber 10 is in the shape of a polygon (octagon) as seen by the base B. Base B is covered by a safety net. The walls 20,21,22 etc. diverge at an optimal aerodynamic angle in the range of about 7–12 degrees from each other. The top of the flight chamber 10 is seen as a rectangle at arrow 110. All or some of the walls 20,21,22 etc. may be transparent.

Figure 4:
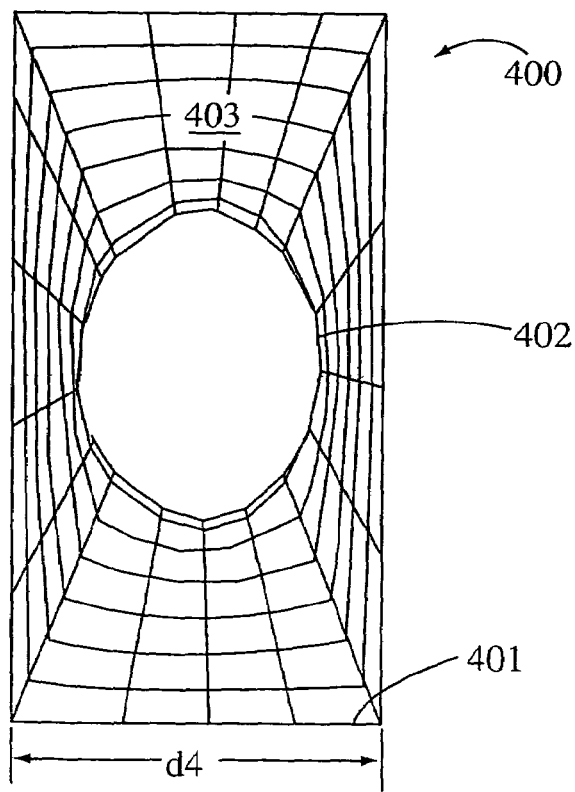
FIG. 4 is a top plan view of an oval outlet, rectangular inlet airflow contractor.

Referring next to FIG. 4 an airflow contractor 400 has the preferred design of a rectangular inlet 401 and an oval outlet 402. Transition walls 403 contract the airflow from the inlet 401 to the outlet 402. Preferably the height $h_2$, FIG. 2, which is sometimes buried underground equals length $d_4$. This combination of shape and dimensions form a cost-effective balance for a relatively low height, and commercially viable simulator 1.

Figures 5, 6:
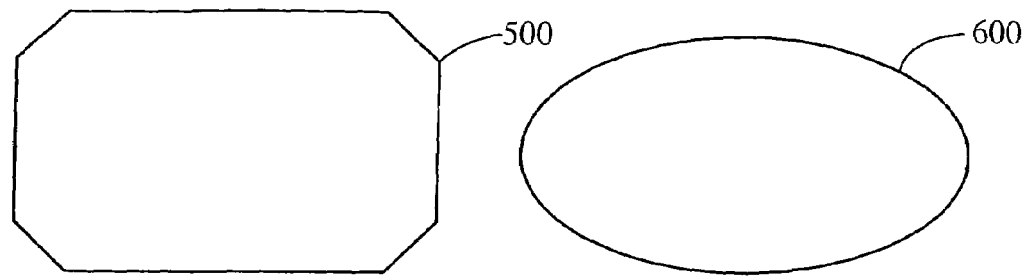
FIG. 5 is a schematic view of an oval/polygon shaped outlet of an airflow contractor.
FIG. 6 is a schematic view of an oval outlet airflow contractor.
Figure 7:
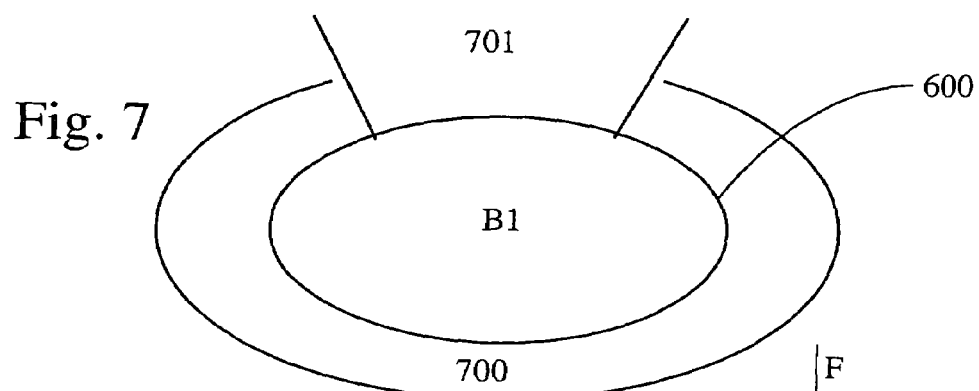
FIG. 7 is a schematic view of an oval viewing area.

Referring next to FIGS. 5,6,7 the term "oval outlet" airflow contractor covers any oval-like shape such as polygon oval outlet 500 and perfectly oval outlet 600. The oval-like shape provides for a larger viewing area 700 compared to a round outlet having the same cross-sectional area. Area 701 includes a staging and entry area. The flight chamber bottom B1 could be in a mall with expensive retail space, wherein the larger viewing area 700 has considerable commercial value.

Figure 8:
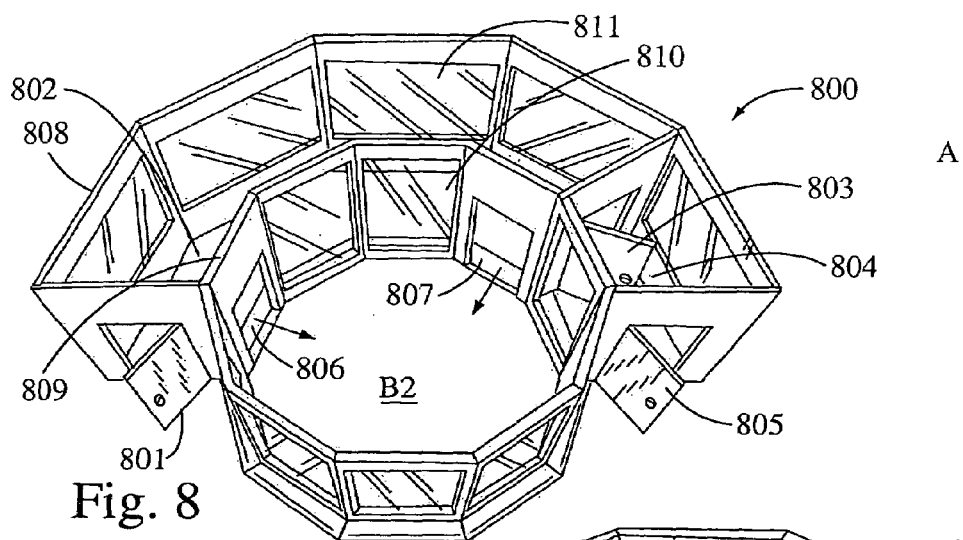
FIG. 8 is a top perspective view of a double airlock staging area.

Referring next to FIG. 8 a two-stage staging chamber 800 consists of a flight chamber bottom B2 with a flight chamber wall 809 having windows 810 and flier entrances 806,807. Entrances 806,807 can be doorless or with hinged doors or with sliding doors. So long as doors 801,805 are closed the fans do not have to be shut down to allow fliers to enter/leave the flight chamber 10. Ambient pressure is shown as A. Doors 801,805 open from ambient A to first staging room 802 and second staging room 804. Door 803 separates the staging rooms 802,804. In operation a group of fliers could enter room 804 while door 803 is closed, then door 805 is closed. Then the fliers would enter room 802 with doors 801,805 closed. Flier entrances 806,807 are used.

Figures 9, 10:
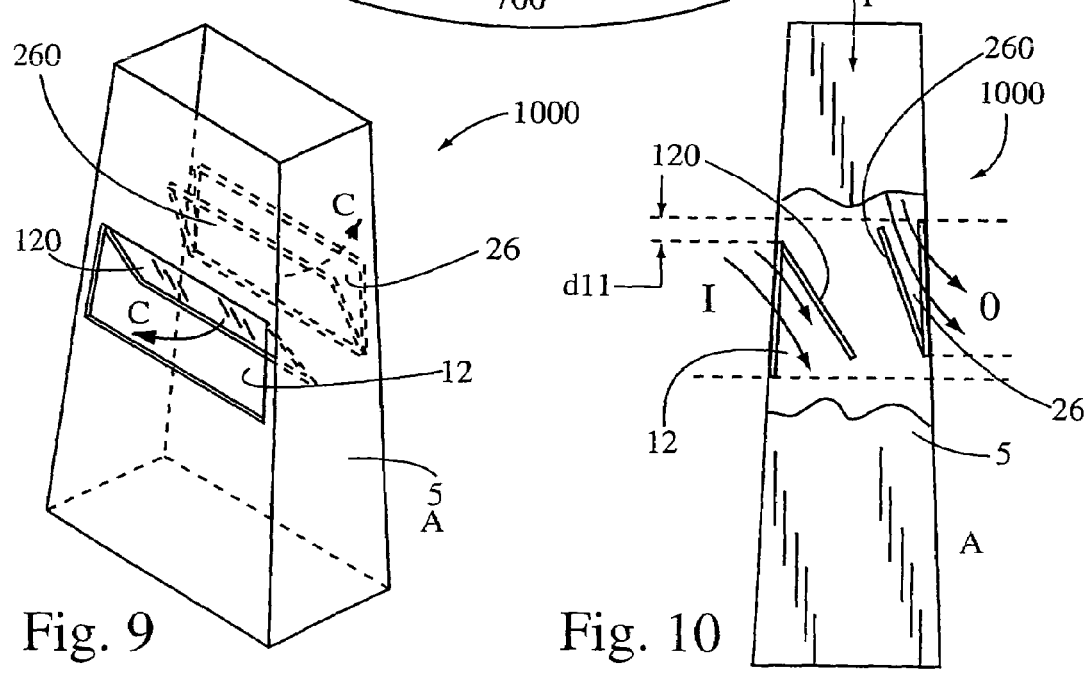
FIG. 9 is a schematic view of a temperature regulator.
FIG. 10 is a side, cutaway view of the temperature regulator of FIG. 9.

Referring next to FIGS. 9,10 the temperature regulating system 1000 consists of a plenum 5 having an airflow F. The outlet 26 is located opposite the inlet 12, but slightly upstream at a distance d11 chosen by design parameters. Preferably louvers 120,260 are controllable from a control room to vary the air exchange from ambient A to the plenum 5. Inlet air volume I must approximate outlet air volume O. The decrease in internal static pressure V is formed by contracting and accelerating the air at nozzle N.

The air exchange system used for closed-circuit wind tunnels disclosed herein consist of two large louvers in each return leg of the tunnels: an exhaust louver and an intake louver. The exhaust and intake louvers are located and oriented so that there is favorable interaction between them. This location is part of what is novel about this system.

The leading edge of the exhaust louver deflects into the tunnel and scoops out the air from inside the tunnel. The intake louver is located on the opposite tunnel wall from the exhaust louver. Its hinge line is designed to line up with the leading edge of the exhaust louver at the design setting. The trailing edge of the intake louver is deflected into the tunnel. It is deflected to a greater extent than the exhaust louver to cause the internal airflow velocity to increase by creating nozzle N. This is the key. That increase in velocity causes a decrease in the internal static pressure (Bernoulli's law). The lower internal static pressure (below atmospheric) actually sucks air into the inlet. As a minimum, the intake louver has the same chord or length as the exhaust louver. In some wind tunnel configurations it is desirable that the intake louver have a greater length or chord than the exhaust louver to reduce the deflection required.

Traditional wind tunnel air exchangers either have the exhaust and intake in separate sections of the wind tunnel, or if they are in the same part of the wind tunnel there is not favorable interaction between the two louvers to cause this desired drop in the internal static pressure. Other designs have employed a screen or some other drag-producing device downstream of the exhaust and upstream of the intake to achieve a drop in internal static pressure in order to cause the outside air to enter the tunnel. While this works, it is very inefficient. This results in unnecessary loss in total pressure and the attendant loss in tunnel performance. Often there is additional ducting required to control the internal static pressure which increases the construction cost. The present invention avoids these problems and achieves the desired air exchange with the lowest power loss.

Figure 11:
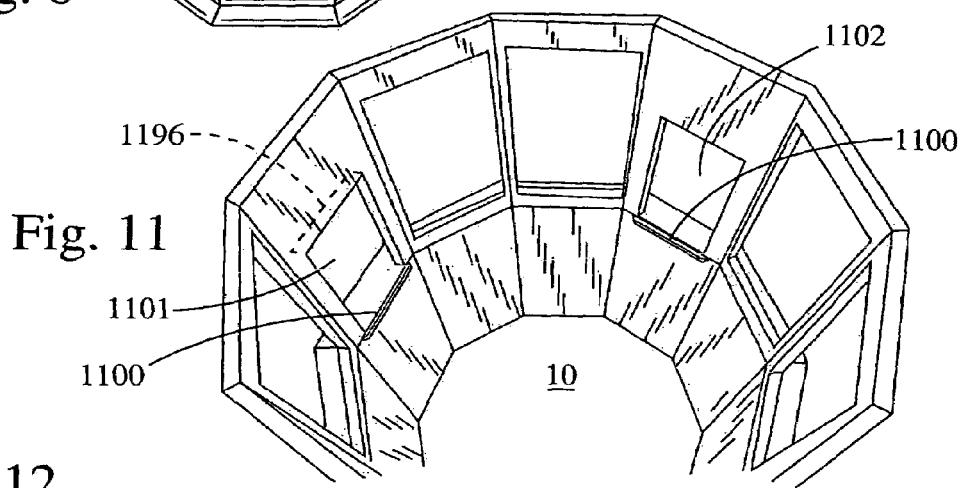
FIG. 11 is a top perspective view of deflectors on flight chamber entrance doors.
Figure 12:
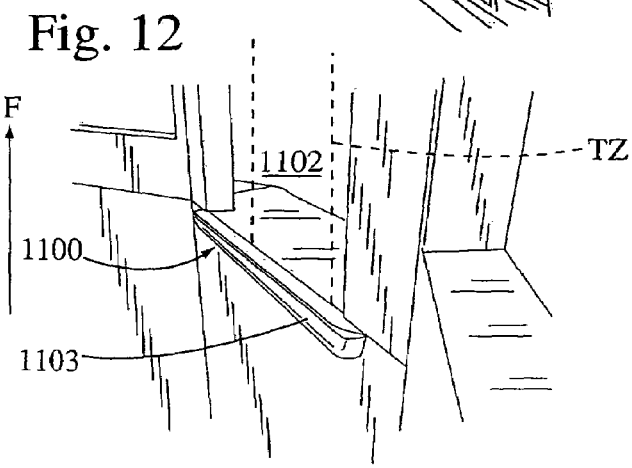
FIG. 12 is a close up view of a deflector.

Referring next to FIGS. 11,12 a deflector 1100 is placed along the bottom edge of a flier entrance 1101,1102 in order to reduce airflow from the flight chamber into the room 802 and thereby minimize cavity resonance in room 802.

The deflector 1100 has an angled leading edge 1103. The leading edge 1103 inclines into the flight chamber 10 in a downstream direction. The flight chamber 10 could be round instead of a polygon as shown. Optionally a deflector 1196 could be mounted at the top of the door, wherein it bends inward into the staging area from the flight chamber.

Figure 13:
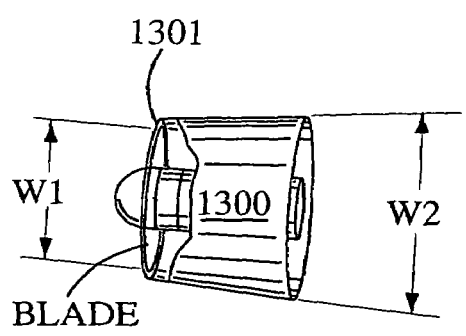
FIG. 13 is a side cutaway view of a fan and housing.
Figure 14:
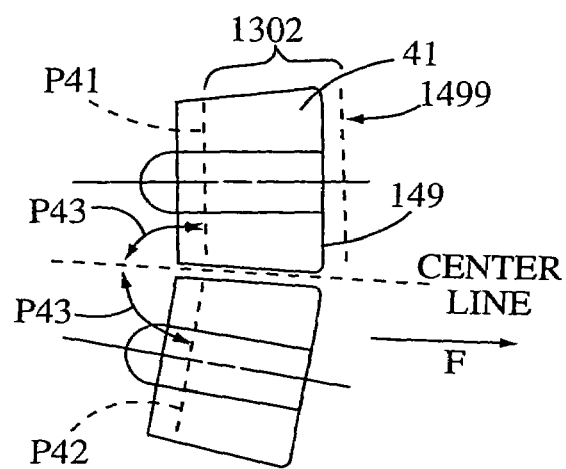
FIG. 14 is a side cutaway view of two fans and housings mounted divergent from a centerline therebetween.

Referring next to FIGS. 13,14 the fans 40,41 of FIG. 2 are shown in their preferred design. They are oriented slightly away from each other relative to a centerline as shown. The fan planes P41,P42 are canted downstream forming acute angle P43. The fan cowling (fan can) 1300 has diverging walls 1302 after the segment next to the blade 1301. Nominally W1 may be 103 inches, and W2 may be 122 inches. A staggering of the fans can help place the two fan cans 1300 closer together such as by moving the front 149 of fan 41 to dotted line 1499. This reduces the distance between the two columns of air from the fans which reduces the length of the return plenum and the height. Blade 1301 could be forward.

Figure 15:
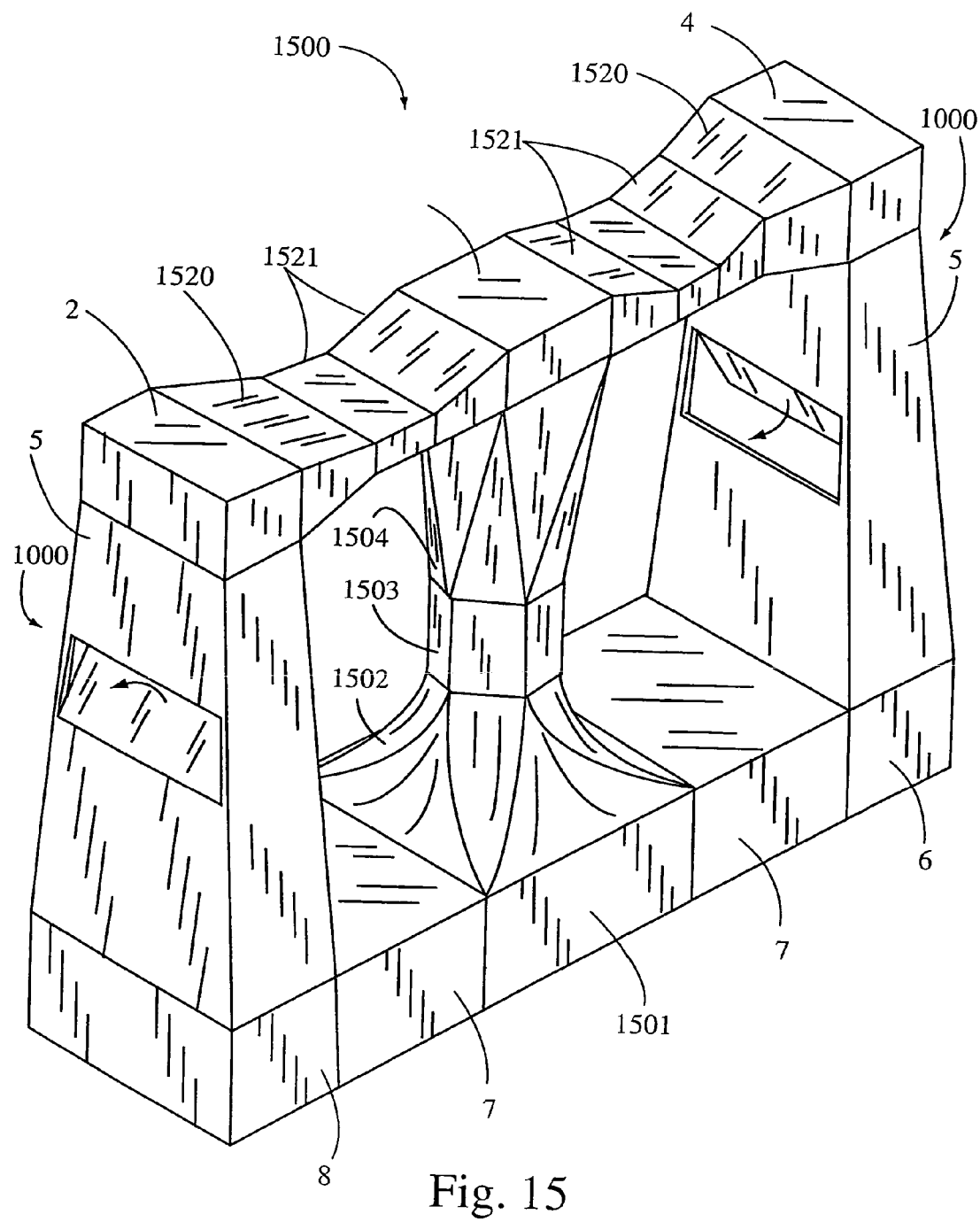
FIG. 15 is a top perspective view of a two return simulator.
Figure 16:
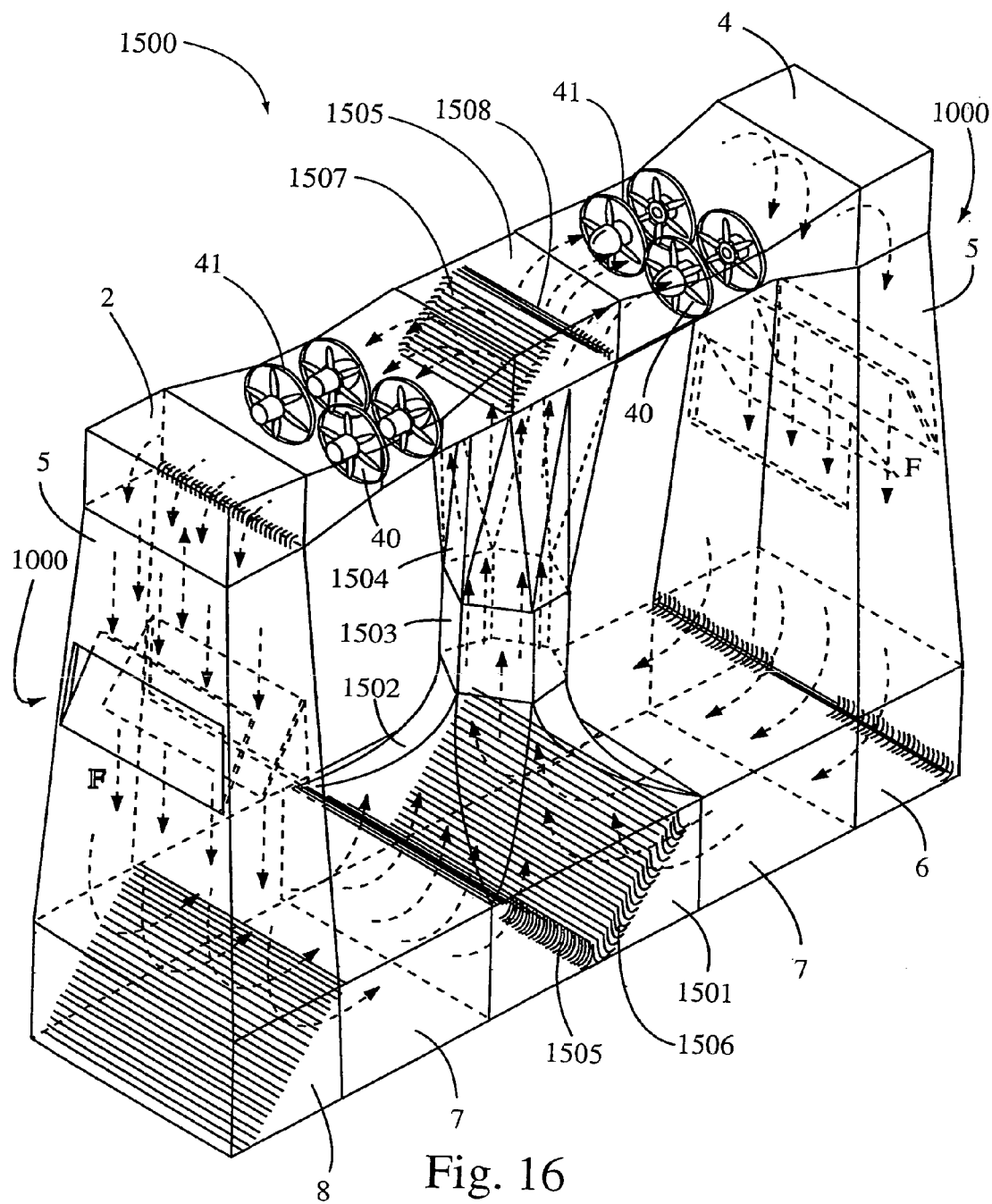
FIG. 16 is a cutaway view of the FIG. 15 embodiment.

Referring next to FIGS. 15,16 a dual return simulator 1500 is shown. Functional equivalent components to the single return simulator 1 are given like numbers, wherein no further description is needed.

In this particular embodiment, the flight chamber 1503 has parallel walls rather than diverging walls in order to provide a relatively constant airflow therein. Above the flight chamber 1503 is a diffuser 1504 which connects to a double diverter 1505. Double diverter 1505 has two diverting vanes 1507,1508. Fan ductwork 1521 supports the fans 40,41. Top diffusers 1520 connect to the diverters 2,4 as shown. A left and a right vertical return plenum 5 each has a temperature regulator system 1000.

The bottom plenums 7 each connect to a double diverter 1501. Double diverter 1501 has two diverting vanes 1505, 1506. An airflow contractor 1502 accelerates the airflow into the flight chamber 1503. A larger flight chamber 1503 can be supported with the four fans shown as compared to the two-fan embodiment of FIG. 2.

Figure 17:
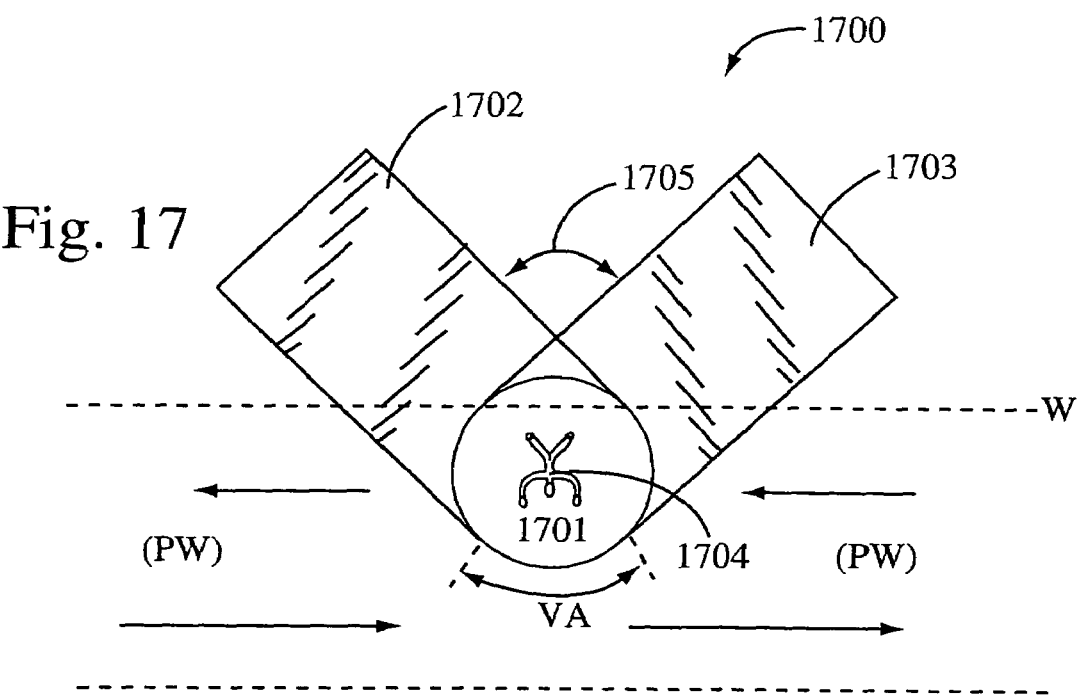
FIG. 17 is a schematic view of a V footprint two return simulator.

Referring next to FIG. 17 a dual return simulator 1700 has a flight chamber 1701 with flier 1704 therein. The air return components 1702,1703 are shown with this top plan view to form a V configuration (angle 1705 is an acute angle) extending from the flight chamber 1701. One use for this simulator 1700 is in a public pedestrian walkway PW as shown, a viewing area VA juts into the pedestrian walkway PW, while the components 1702,1703 are soundproofed and hidden by wall W. As noted above, the fans and related ductwork may be mounted on the roof.

Figure 18:
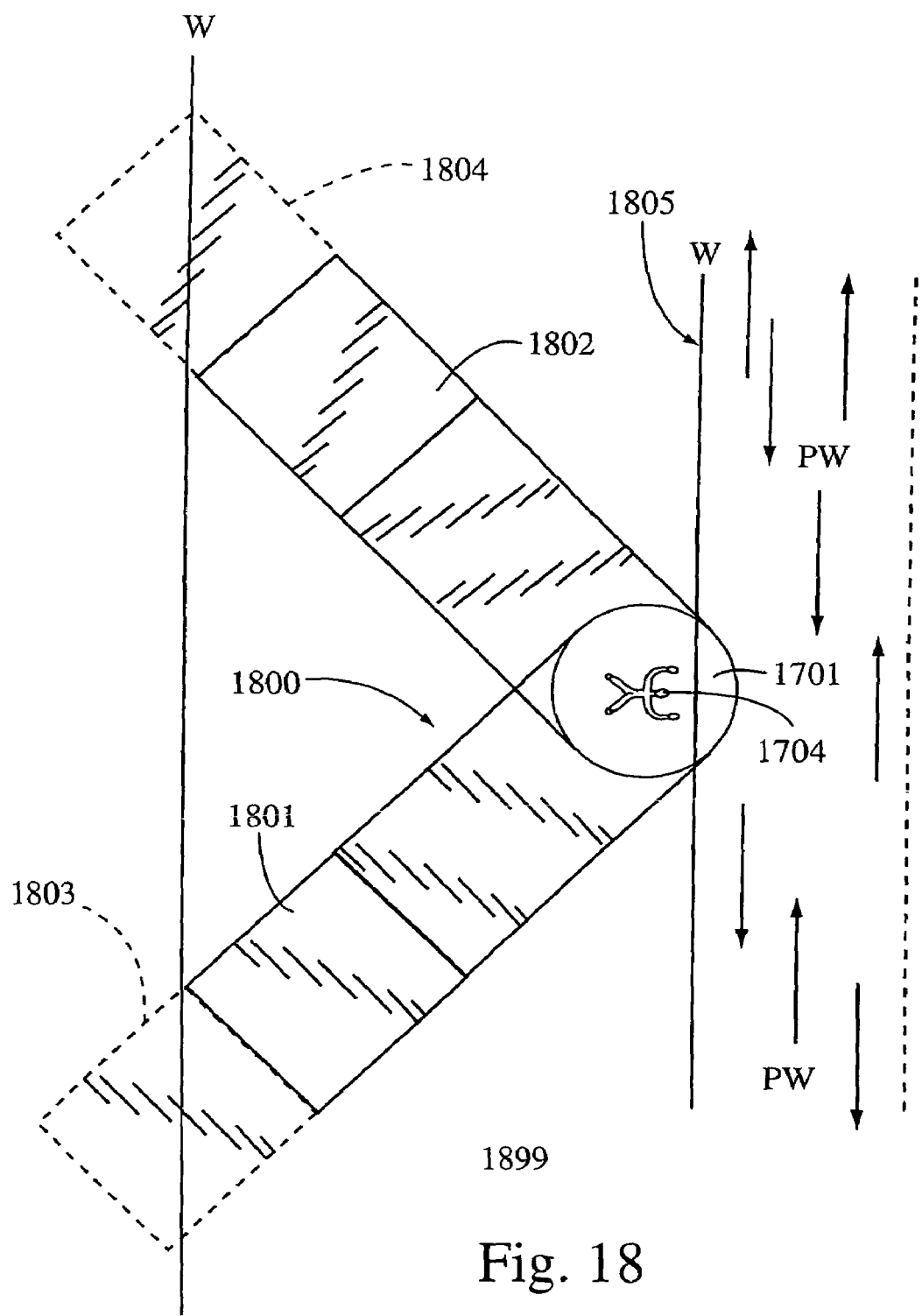
FIG. 18 is a schematic view of a V footprint two return simulator in a mall.

Referring next to FIG. 18 another V shaped simulator 1800 is set in a different mall environment. The pedestrian walkway PW has expensive retail store space along area 1805. Less expensive mall space 1899 may have storage areas and could house return air components 1801,1802. An outside wall WOUT locates the return air components 1803,1804 outside as shown.

Figure 19:
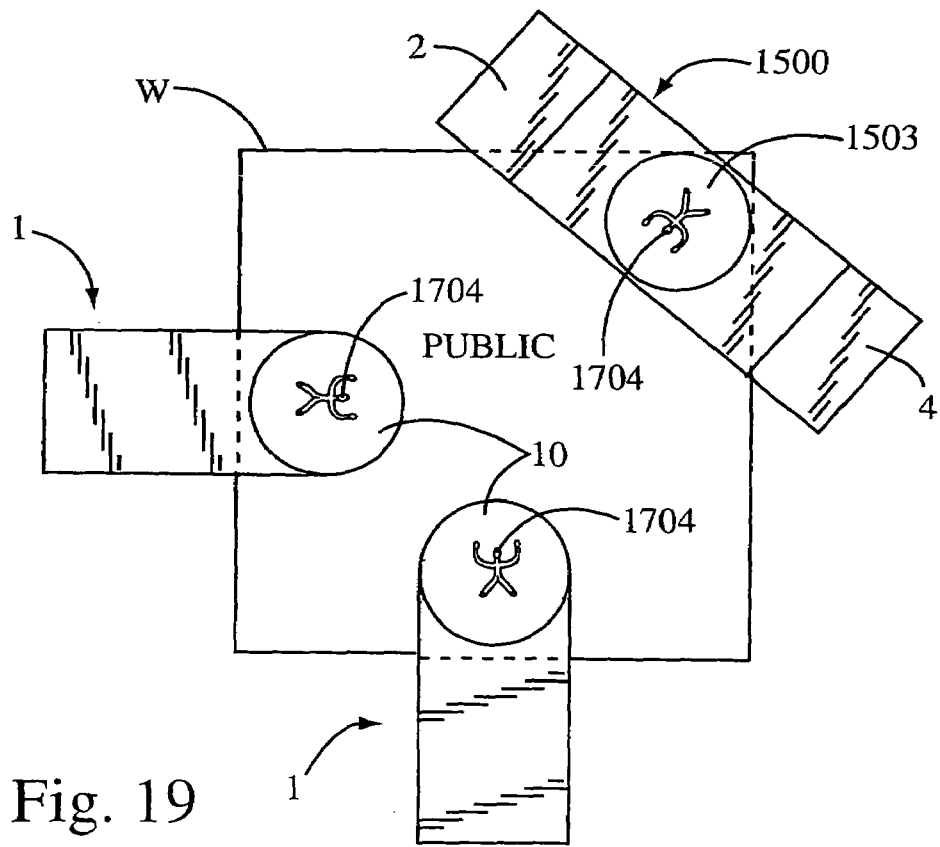
FIG. 19 is a schematic view of a multi-simulator configuration in a building.

Referring next to FIG. 19 a wall W creates an enclosed area designated as PUBLIC. Possible configurations of simulators 1 and 1500 are shown. Flying humans 1704 could create an exciting indoor amusement area designated as PUBLIC.

Figure 20:
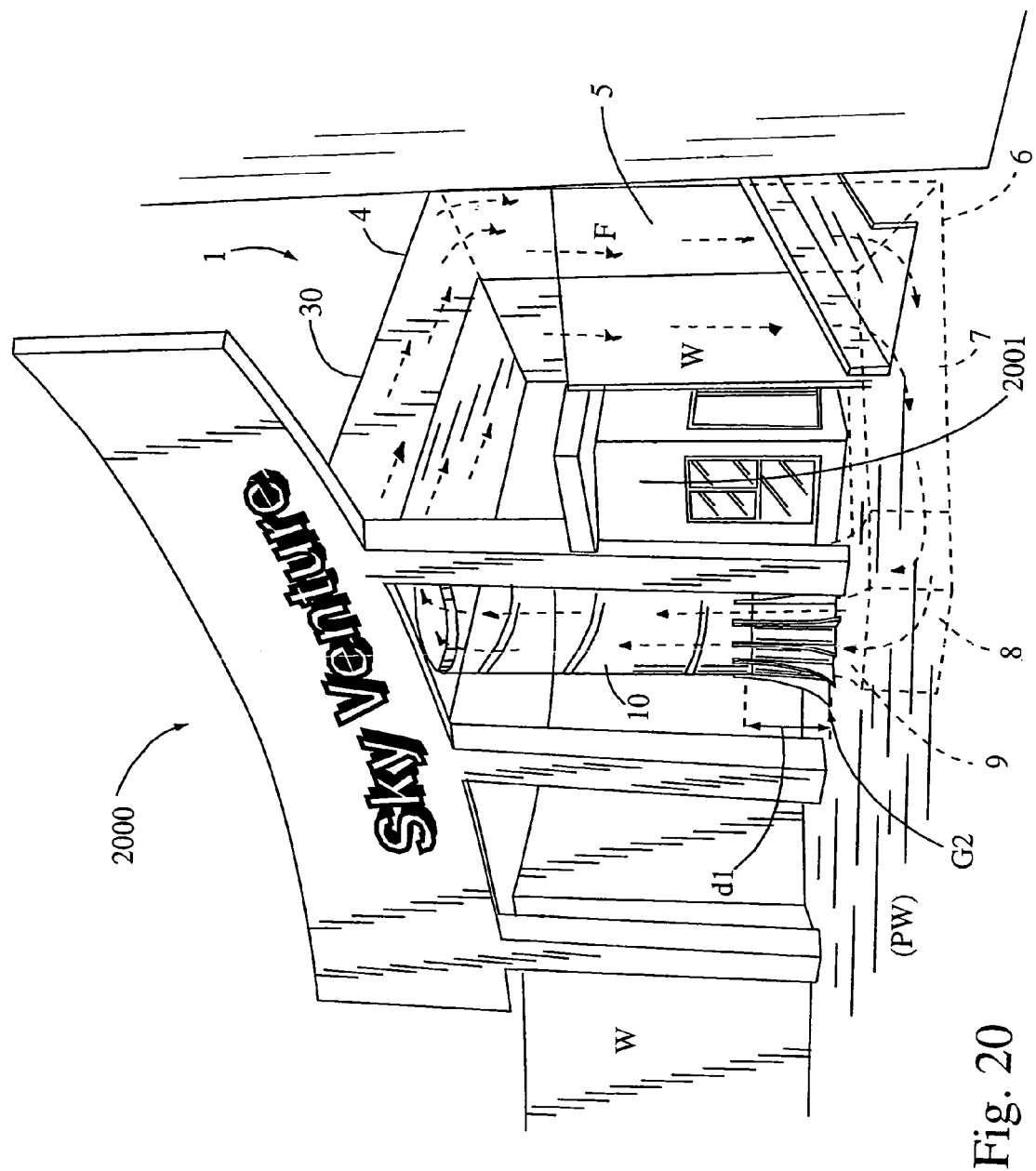
FIG. 20 is a side perspective view of a mall type viewing area for a simulator.

Referring next to FIG. 20 an artist's rendering of the simulator 1 of FIG. 1 is shown, wherein a mall 2000 has a pedestrian walkway PW. The term "mall" herein includes a high-people density entertainment venue including amusement parks, theatre complexes, family entertainment centers, and college campuses. Ground level $G_2$ forms pedestal area $d_1$ so that the public looks up into the transparent flight chamber 10. A ticketing area 2001 could blend in with other retail store fronts. Walls W and the ground $G_2$ screen components 5,6,7,8 are shown in dots.

Figure 21:
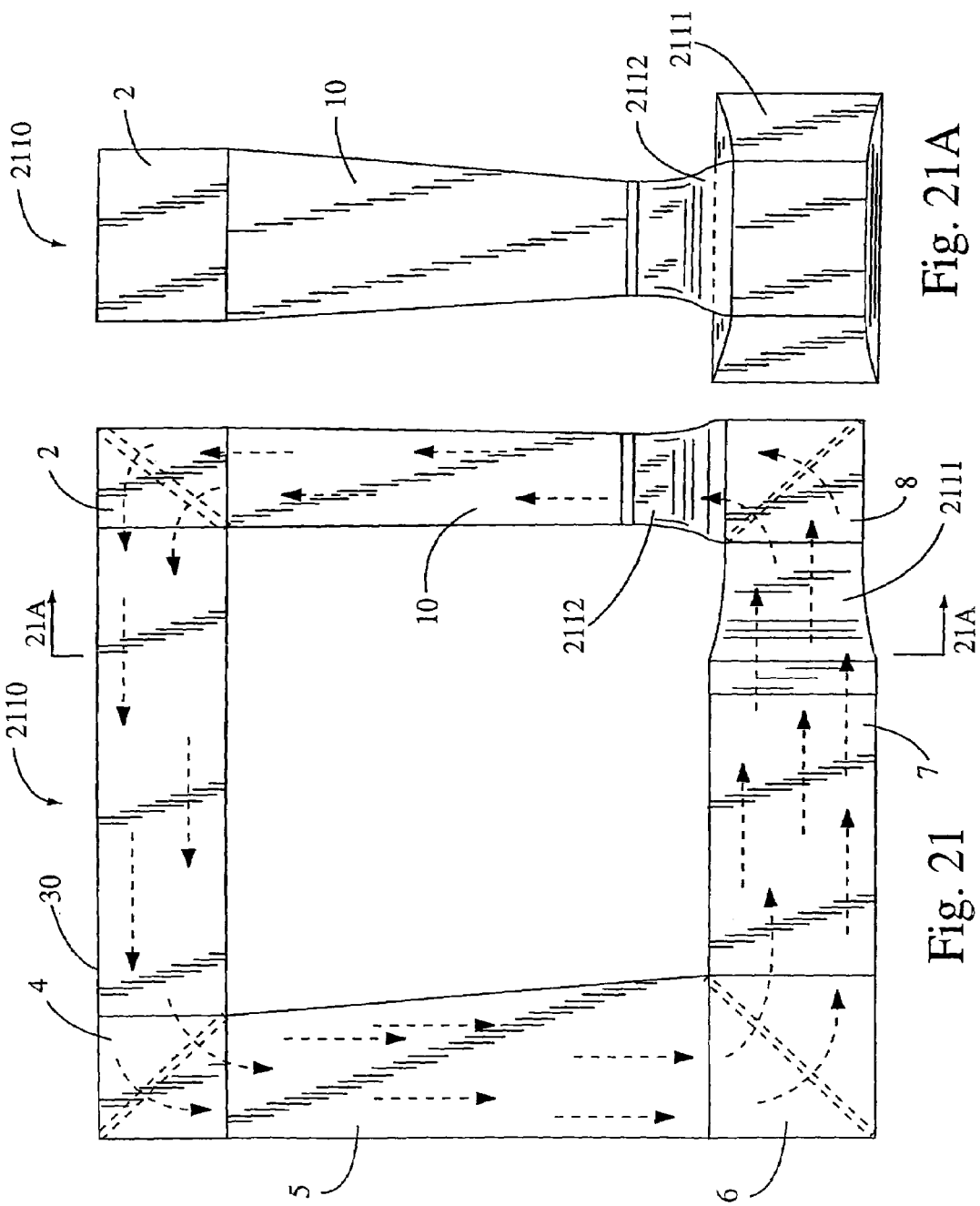
FIG. 21 is a schematic view of a dual contractor (one underground and horizontal) system.

Referring next to FIGS. 21 and 21A, a two-stage airflow contractor is shown. A first stage contractor 2111 is horizontal and feeds diverter 8. The second stage contractor 2112 is vertical and feeds the flight chamber 10. The simulator 2110 could bury the first stage contractor 2111 underground. The result is less noise and less height for the second stage contractor 2112. This invention can provide a lower overall height for the simulator 2110.

Figure 22:
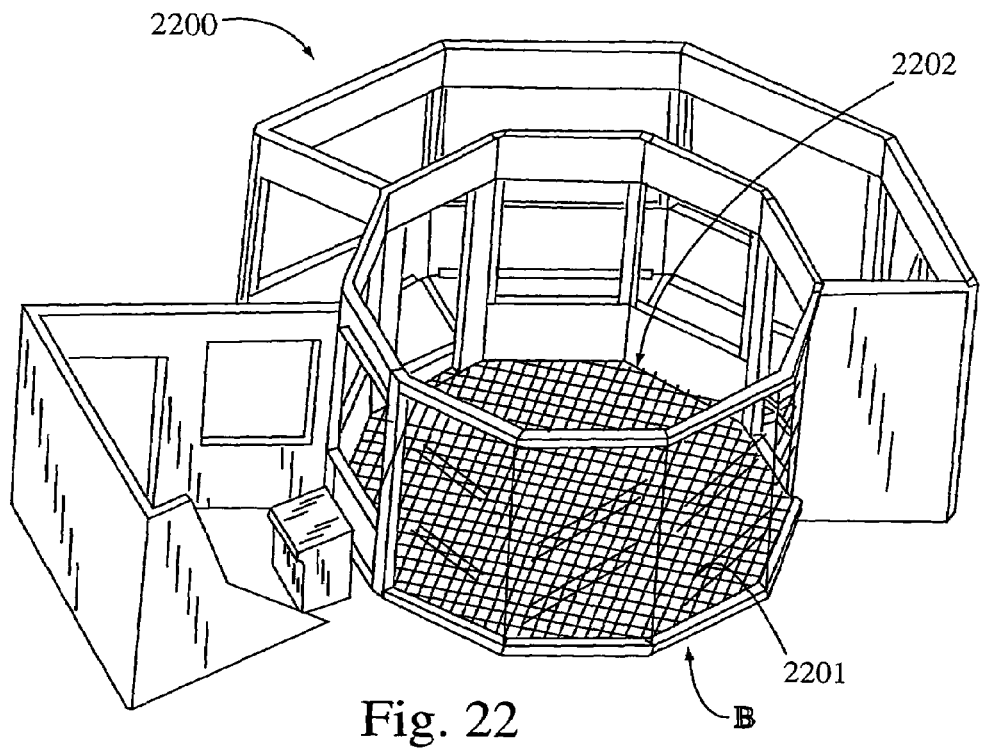
FIG. 22 is a top perspective view of a cable floor.

Referring next to FIG. 22 a staging area 2200 has a flight chamber 2202 with a bottom B consisting of a mesh net 2201.

Cable Floor

The floor of the flight chamber is a $3/32$-17-strand stainless steel aircraft cable woven into a 2'×2' (60 cm×60 cm) grid. Both ends of the cable are run through a compression spring. One hundred-twenty two (122) cables make up the tunnel floor.

The compression of the springs is adjusted to give the proper "bounce to the floor providing increased safety should a flyer become unstable and fall to the cable floor.

Tunnel Viewing Walls

There are 11 large 1¼" (31 mm) acrylic panels which allow the controller, flyers and spectators in the staging/viewing area to see the activity in the flight chamber and flight deck.

Figure 23:
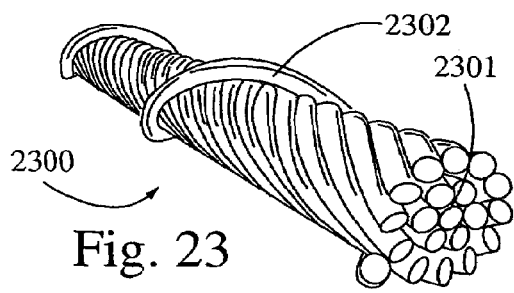
FIG. 23 is a side perspective view of an anti-drag cable, first embodiment.
Figure 24:
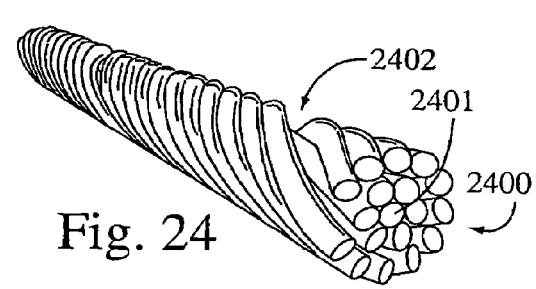
FIG. 24 is a view of a second embodiment cable.
Figure 25:
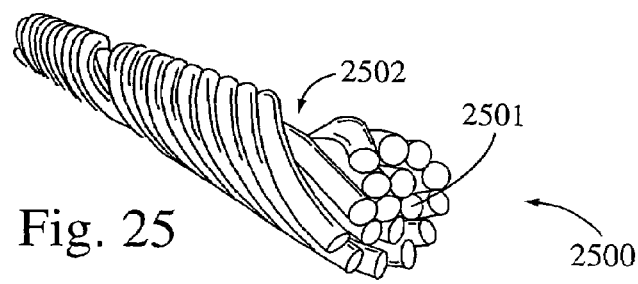
FIG. 25 is view of a third embodiment cable.

There is a large acrylic panel that allows spectators to see inside the control room. FIGS. 23,24,25 offer individual cable designs which could form mesh net 2201. Basic aerodynamics teaches that a wing-type profile reduces drag as opposed to a blunt or flat profile. Cable 2300 has a standard twisted element core 2301 with an external helical wrap 2302.

Cable 2400 has a modified twisted element core 2401 with a single helical element 2402 missing.

Cable 2500 has a modified twisted core 2501 with double helical elements 2502 missing.

Figure 26:
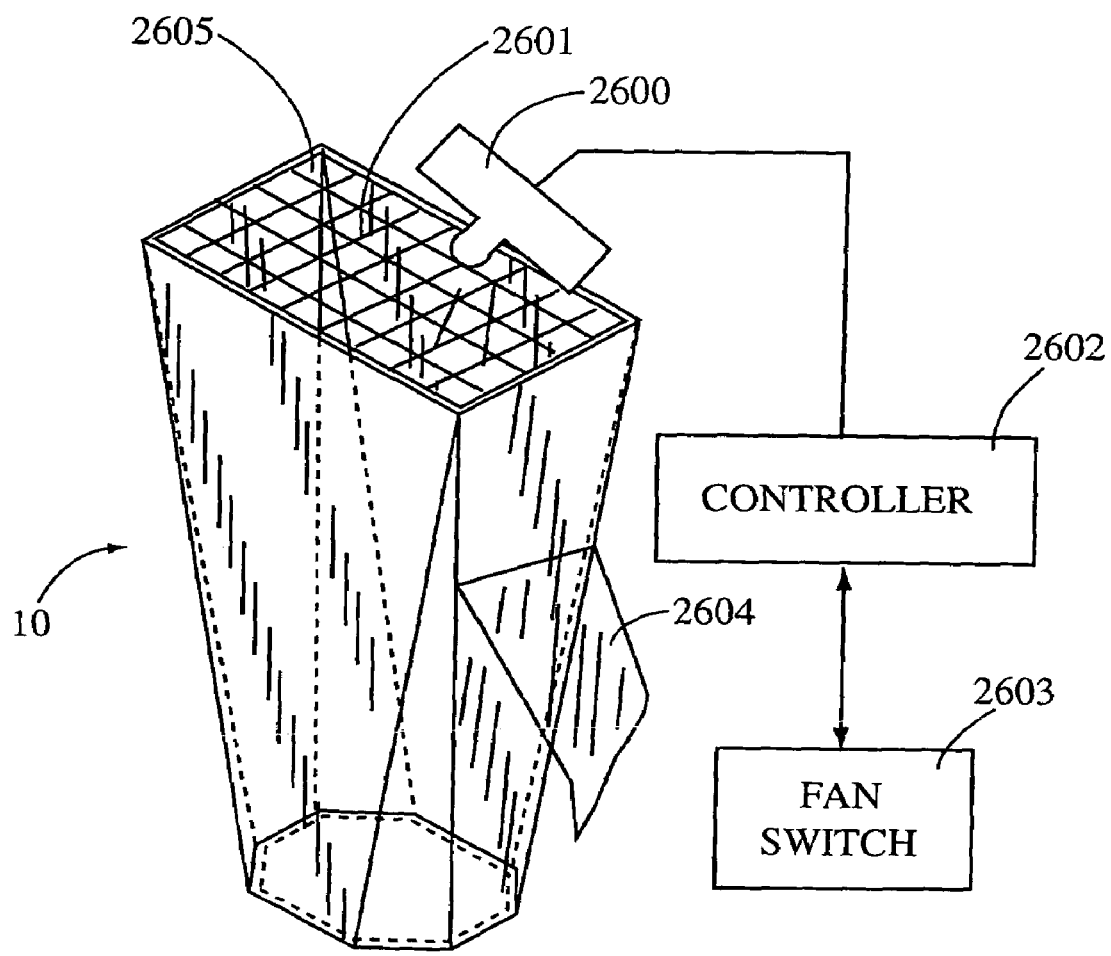
FIG. 26 is a schematic view of a floor sensor/shutoff system.

Referring next to FIG. 26 a flight chamber 10 has a flier sensor 2600 that uses energy waves 2601 (light, radio, sound, UV, etc.) to detect a flier moving too high into the flight chamber 10. A controller 2602 may consist of simple on/off output logic, or current modulator or the like to temporarily reduce the airflow to drop the flier lower into the flight chamber. An emergency ambient door 2604 could also be opened by the controller 2602. A mesh net 2605 may also be used to prevent fliers from traveling too high.

Figure 27:
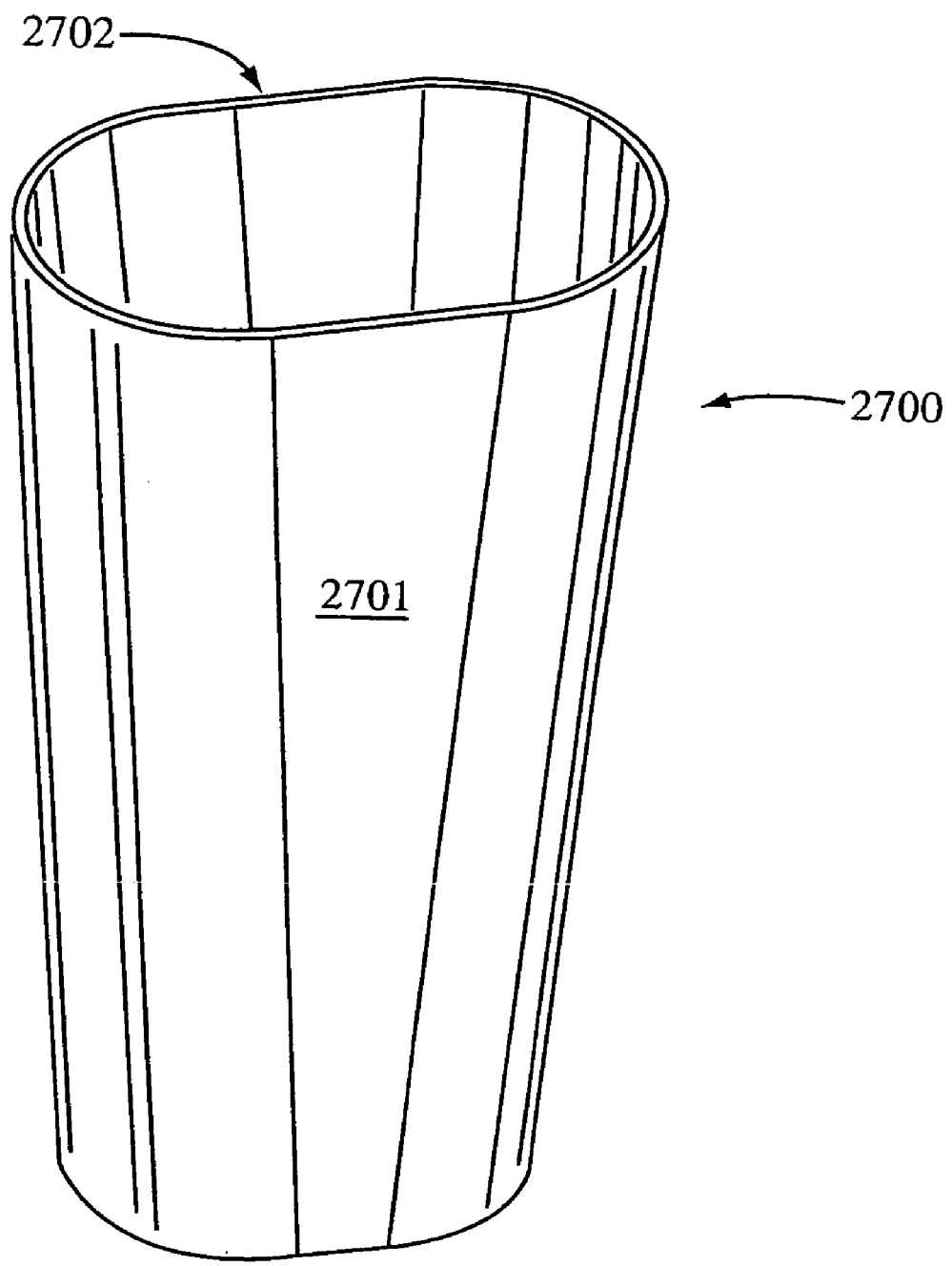
FIG. 27 is a top perspective view of a rounded diffuser.

Referring next to FIG. 27 another diffuser 2700 might also serve as a flight chamber. The walls 2701 could be three-inch acrylic panels. The oval outlet 2702 has curved edges.

Figure 28:
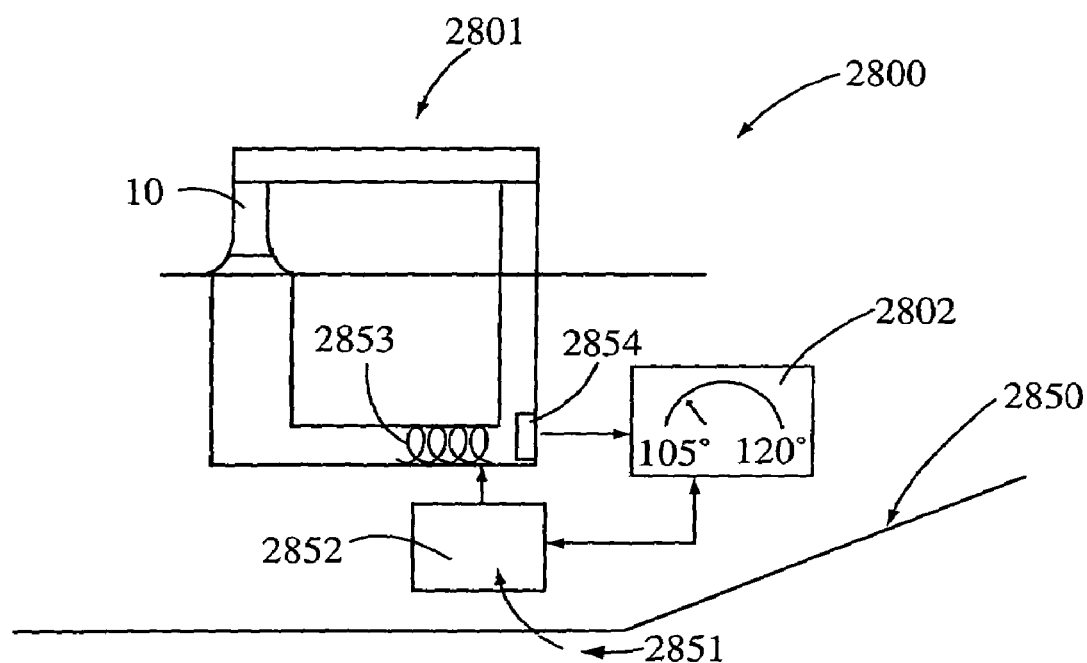
FIG. 28 is a schematic view of a cruise ship having a water-cooled simulator.

Referring next to FIG. 28 a ship 2850 has a simulator 2801 with a seawater cooling system 2800. A seawater inlet 2851 feeds a heat exchanger 2853 in the simulator via a flow controller 2852. An air temperature sensor 2854 communicates to a temperature controller 2802 to keep the air temperature at a set point by controlling the flow controller 2852.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A vertical wind tunnel skydiving simulator comprising:
   a recirculating airflow plenum having a generally rectangular configuration;
   a vertical flight chamber capable of floating at least one human housed within a first vertical side member of the generally rectangular configuration and located on an inlet side of a fan assembly;
   said fan assembly further comprising a plurality of fans mounted horizontally in a top member of the generally rectangular configuration;
   wherein the top member return duct, the first vertical side member, a second vertical side member return duct of the generally rectangular configuration each have a divergent wall segment to expand a flow of recirculating air while maintaining a generally laminar airflow; and
   wherein an uppermost part of the top member is no more about 50–120 feet above a lowest part of a bottom member of the generally rectangular configuration.

2. The simulator of claim 1, wherein the flight chamber further comprises a bottom having a mechanical safety net and a top segment, said top segment having a human sensor, wherein the human sensor connects to a controller which slows the flow of recirculating air when a human is sensed flying near the top segment.

3. The simulator of claim 2, wherein the controller further comprises a fan control means functioning to slow at least one fan.

4. The simulator of claim 3, wherein the fan control means further comprises a fan power control module to temporarily reduce a current flow to at least one fan.

5. The simulator of claim 1, wherein the vertical flight chamber further comprises divergent walls to decrease an airflow rate therethrough.

6. The simulator of claim 5, wherein the first vertical chamber further comprises an oval horizontal cross-sectional shape.

7. The simulator of claim 1 further comprising a temperature regulator having an air inlet louver located at an opposite opposing side of an air outlet louver in a duct member from an air outlet louver, wherein an acceleration nozzle is formed by the louvers, thereby creating a decreased static pressure zone and pulling outside air into the air inlet.

8. The simulator of claim 7, wherein the outlet louver faces upstream inside the duct member, and the inlet louver faces downstream inside the duct member, thereby forming the acceleration nozzle.

9. The simulator of claim 1, wherein the fan assembly further comprises a housing having divergent walls to decrease an airflow rate therethrough.

10. The simulator of claim 1, wherein the vertical flight chamber further comprises a staging area with multiple chamber means functioning to enable ingress and egress from the vertical flight chamber while maintaining an operable for flight airflow through the flight chamber.

11. The simulator of claim 1, wherein each fan is mounted in a non-parallel fashion to an adjacent fan and away from a centerline therebetween.

12. The simulator of claim 1, wherein the flight chamber has an entry door with a deflector at its downstream bottom edge.

13. The simulator of claim 1, wherein the bottom member is buried underground, thereby forming a mounting height above a ground level for the flight chamber at or above the ground level.

14. The simulator of claim 1, wherein an inlet to the first vertical side member has the same dimensions as a cross-sectional segment of the bottom member.

15. The simulator of claim 1, wherein the uppermost part of the top member is no more than about 50–60 feet above the lowest part of the bottom member.

16. A vertical wind tunnel skydiving simulator comprising:
   a recirculating airflow plenum having a generally rectangular configuration with a central vertical member and a first and a second vertical return air plenum;
   a vertical flight chamber capable of floating at least one human housed within the central vertical member;
   said fan assembly further comprising a plurality of fans mounted horizontally in a top member of the generally rectangular configuration;
   wherein the top member, the first and second vertical side member, and the central vertical member each have a divergent wall segment to expand a flow of recirculating air while maintaining a generally laminar airflow; and
   wherein an uppermost part of the top member is no more than about 50–120 feet above a lowest part of a bottom member of the generally rectangular configuration.

17. The simulator of claim 16, wherein the flight chamber further comprises a bottom having a mechanical safety net, and a top segment, said top segment having a human sensor, wherein the human sensor connects to a controller which slows the flow of recirculating air when a human is sensed flying near the top segment.

18. The simulator of claim 17, wherein the controller further comprises a fan control means functioning to slow at least one fan.

19. The simulator of claim 18, wherein the fan control means further comprises a fan power control module to temporarily reduce a current flow to at least one fan.

20. The simulator of claim 16, wherein the vertical flight chamber further comprises divergent walls to decrease an airflow rate therethrough.

21. The simulator of claim 16 further comprising a temperature regulator having an air inlet louver located opposite an air outlet louver in a duct member, wherein an acceleration nozzle is formed by the louvers, thereby pulling outside air into the air inlet louver.

22. The simulator of claim 21, wherein the outlet louver faces upstream inside the duct member, and the inlet louver faces upstream in the duct member, thereby forming the acceleration nozzle.

23. The simulator of claim 16, wherein the fan assembly further comprises a housing having divergent walls to decrease an airflow rate therethrough.

24. The simulator of claim 16, wherein the vertical flight chamber further comprises a staging area with multiple chamber means functioning to enable ingress and egress from the vertical flight chamber while maintaining an operable for flight airflow through the flight chamber.

25. The simulator of claim 16, wherein the flight chamber further comprises an oval horizontal cross-sectional shape.

26. The simulator of claim 16, wherein each fan is mounted in a non-parallel fashion to an adjacent fan and away from a centerline therebetween.

27. The simulator of claim 16, wherein the flight chamber has an entry door with a deflector at its downstream bottom edge.

28. The simulator of claim 16, wherein the bottom member is buried underground, thereby forming a mounting height above a ground level for the flight chamber at or above the ground level.

29. The simulator of claim 16, wherein an inlet to the central vertical member has the same dimensions as a cross-sectional segment of the bottom member.

30. The simulator of claim 16, wherein the uppermost part of the top member is no more than about 50–60 feet above the lowest part of the bottom member.

31. A vertical wind tunnel skydiving simulator comprising:
a recirculating airflow plenum;
a fan assembly to provide an airflow for human flight in a vertical flight chamber;
a portion of said airflow plenum further comprising divergent walls to expand and slow the airflow;
said airflow plenum further comprising a temperature regulator;
said temperature regulator further comprising an inlet louver mounted about opposite an outlet louver in a common segment of the plenum, said outlet louver having a door facing inward and upstream in the common segment of the plenum, said inlet louver facing inward and downstream in the common segment; and
wherein the doors form an internal narrowing of the common segment of the plenum, thereby forming a decreased static pressure zone which draws air into the inlet louver.

32. A flight simulator comprising:
a recirculating vertical wind tunnel flight chamber; at least two vertical return plenums;
wherein two vertical return plenums form a V shape with their connecting plenums to the flight chamber; and
wherein all the vertical return plenums are within an arc of less than 180 degrees on one side of the flight chamber.

33. A flight simulator comprising:
a vertical wind tunnel flight chamber;
a return air plenum system having at least a two-stage airflow contraction assembly;
wherein a first stage contraction member is horizontally mounted along a bottom plenum; and
a second stage contraction member is vertically mounted under the flight chamber.

34. A public entertainment system comprising:
a recirculating vertical wind tunnel having a human flight chamber which has a transparent section enabling a viewing of a flier in flight therein;
said flight chamber mountable at or near a ground level, thereby enabling passers-by to view the flier in flight;
said flight chamber having at least two return plenum, all of said return plenums contained in an arc of less than 180 degrees on one side of the flight chamber;
said flight chamber mountable proximate to a public walkway; and
wherein said vertical wind tunnel has at least one machinery component segregated from the public walkway.

* * * * *